H. T. HERR.
PRESSURE CONTROLLING MECHANISM.
APPLICATION FILED AUG. 11, 1910.
1,185,317.
Patented May 30, 1916.
3 SHEETS—SHEET 3.
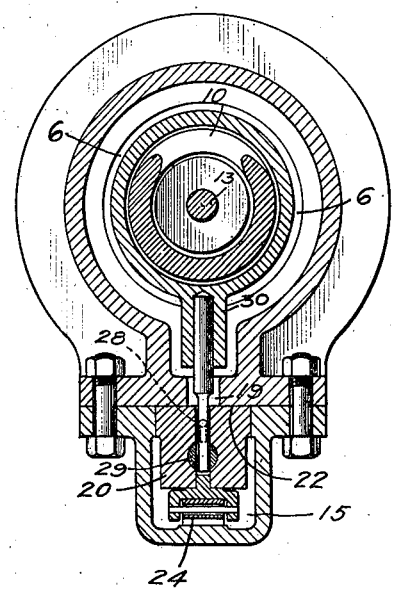
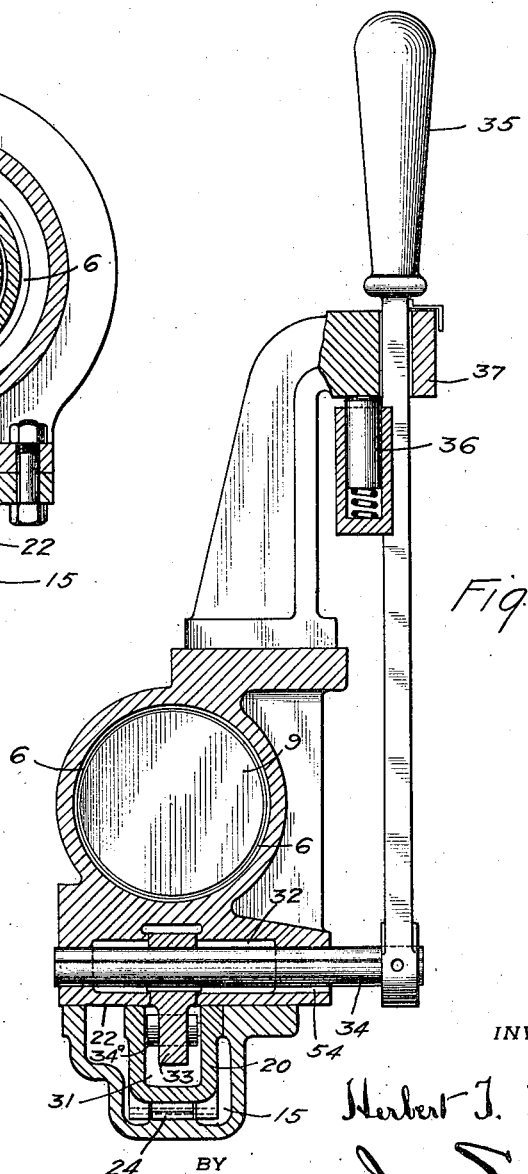

UNITED STATES PATENT OFFICE.

HERBERT T. HERR, OF PITTSBURGH, PENNSYLVANIA, ASSIGNOR, BY MESNE ASSIGNMENTS, TO THE WESTINGHOUSE MACHINE COMPANY, OF EAST PITTSBURGH, PENNSYLVANIA, A CORPORATION OF PENNSYLVANIA.

PRESSURE-CONTROLLING MECHANISM.

1,185,317. Specification of Letters Patent. Patented May 30, 1916.

Application filed August 11, 1910. Serial No. 576,737.

*To all whom it may concern:*

Be it known that I, HERBERT T. HERR, a citizen of the United States, and a resident of Pittsburgh, in the county of Allegheny and State of Pennsylvania, have made a new and useful Invention in Pressure-Controlling Mechanism, of which the following is a specification.

This invention relates to pressure controlling mechanism and one object is to provide means whereby fractional pressure or any pressure from zero to maximum may be admitted from a source of supply to a suitable pressure receiving means, as for example, a pressure receiving chamber.

Another object of the invention is to provide means whereby a determined pressure will be automatically maintained in the pressure receiving chamber. The determined pressure will be maintained irrespective of leakage either through the inlet to the receiving chamber or from the outlet.

Another object of the invention is to provide means whereby the controller may be manually operated to be set for any determined pressure exhausted from the source of supply to the receiving means.

Other objects and advantages of this invention will be referred to hereinafter, it being understood that changes in form, proportion and minor details of construction may be resorted to without departing from the spirit of the invention or sacrificing any of its advantages.

Figure 1:
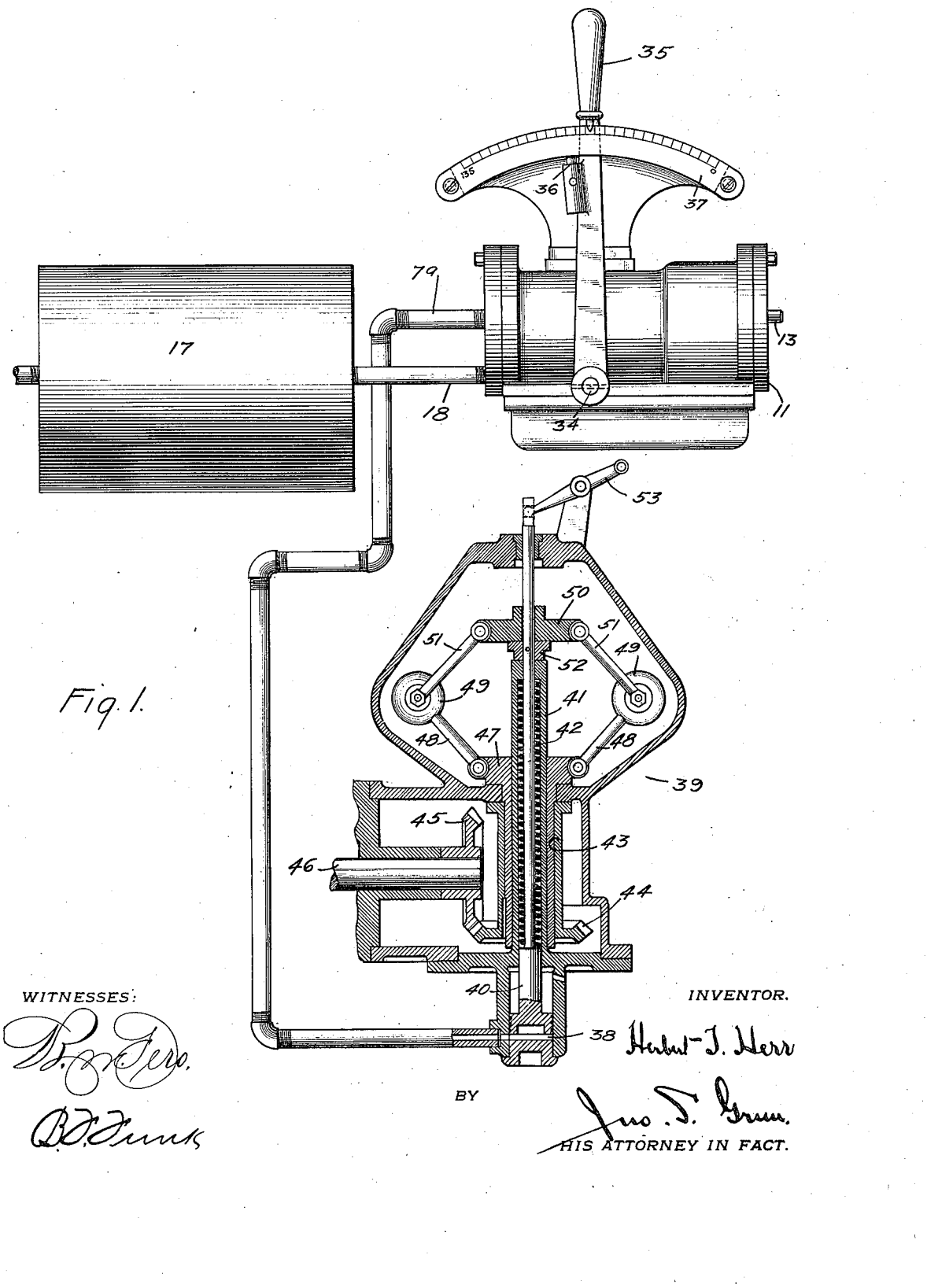
Figure 2:
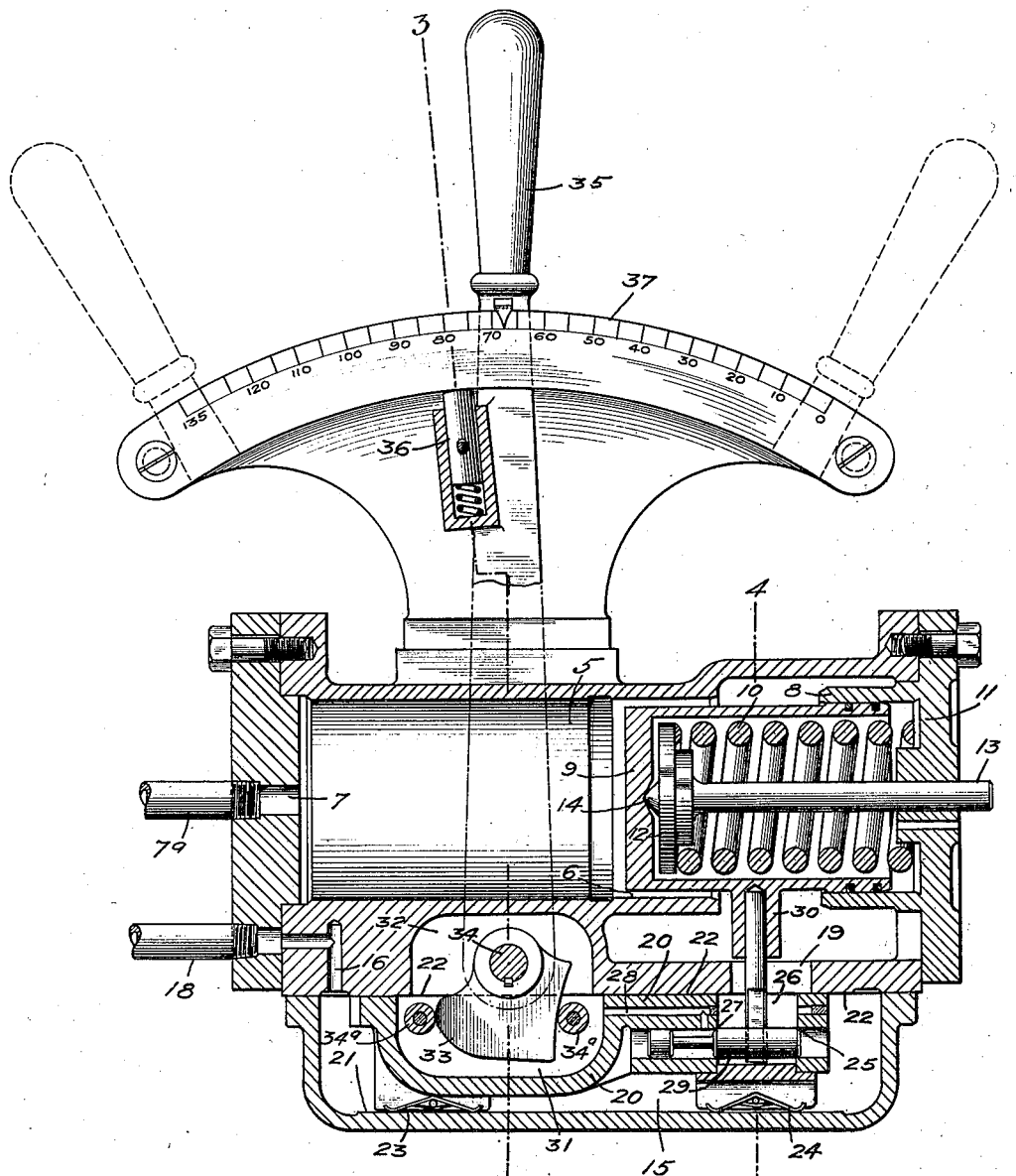

In the drawings: Figure 1 represents a more or less diagrammatical view of an installation embodying my invention; Fig. 2 represents a vertical, longitudinal sectional view through a controller constructed in accordance with my invention; Fig. 3 is a sectional view on the line 3—3 of Fig. 2; and Fig. 4 is a sectional view on the line 4—4 of Fig. 2.

In order to convey a comprehensive idea of one of the uses of my controller and its operation, I have illustrated it as being associated with a speed responsive device in which air is used to load the weight carrying spindle to counteract the effect of the weights, the centrifugal force imparted to them and the effect of the spring of the speed responsive device. The speed responsive device illustrated in this case is described in detail in a companion application filed by me on or about July 16, 1910, Serial No. 572,302, so I have deemed it unnecessary to include a detailed description of it here and will include only so much as is necessary to show the coöperative relation between the device to be operated and the controller.

In Figs. 1 and 2, I have illustrated one embodiment of a controller constructed in accordance with my invention and the form herein shown consists of a chamber 5 provided with an inlet 6 and an outlet 7 provided with a pipe 7ª leading to a pressure actuated device. At one end of the cylinder 5 is a piston guide 8 to receive a longitudinally moving piston 9 normally extended in one direction by means of a spring 10, one end of which bears against a spring seat at the end 11 of the cylinder 5 and the other end of which bears against a disk 12 on the end of the piston rod 13, which may extend through the end 11 of the cylinder 5 to be guided thereby, the disk 12 having a lug or projection 14 to provide a point contact with the inner face of the piston 9.

By reference to Fig. 2, it will be observed that in the form shown the inlet 6 is annular, that is, it is provided by the inner wall of the cylinder 5 and the exterior of the piston 9. Adjacent to the cylinder 5 is an air chest 15 having an inlet port 16 communicating with a suitable source of supply, as for example, a reservoir 17 through the pipe 18. The outlet or exhaust for the air chest 15 is shown at 19 so that air passing into the chest through the port 16 may pass through the port 19 into the cylinder 5. In order to control the delivery of air through the port 19 and thereby control the pressure within the chamber 5, I have provided a slide valve designated by the reference numeral 20. This slide valve 20 is shown as consisting of an elongated body portion slidable upon the floor 21 of the air chest 15 and held against its seat 22 by means of springs 23 and 24, and also by means of the pressure within the chest. The valve 20 has within it ports 25, 26, 27 and 28. The ports 25 and 27 are normally closed or approximately closed by a piston valve 29 connected to the piston 9 by a finger 30. The slide valve 20 is provided with a pocket or recess 31, which approximately coincides with a similar one 32, here shown as being formed in the wall of the chamber 5 and these two recesses receive a finger illustrated as a cam 33 on the shaft 34 extending through the wall of the cylinder 5 and moving against the rollers 34$^a$. On the shaft 34 is a controller lever 35 carrying a friction dog 36 to frictionally engage a segment 37 adjacent thereto and which may be provided with suitable graduations or a scale whereby the lever 35 may be moved to the proper position, with respect to the segment, to insure proper increments of speed of the motor carrying the speed responsive device, or so that suitable pressure will be maintained in the cylinder 5.

The finger 33 need not necessarily be a cam, but when the controller is employed in conjunction with a speed responsive device, I find it is desirable to employ a cam of the contour illustrated, because the pressure from the pipe 7$^a$ into the cylinder 38 of the speed responsive device 39 will vary directly as the pressure in the cylinder 5 and the resistance opposed to the weights carried by the piston or spindle 40 will be directly proportional to the pressure in the cylinder 38; whereas the force acting against the piston 40 and the pressure under it will be proportional to the square of the speeds of the weights, so the movements of the valve 20 must be proportionally increased for progressive increased increments of speed of the governor or speed responsive device. In other words, the progressive movements of the handle 35 may give any desired variation in speed of the governed apparatus. In the apparatus illustrated the segment 37 is so graduated that the scale indicates the revolutions per minute of the machine or engine connected to the governor, and the operating faces of the cam are constructed accordingly; that is, so that equal increments of motion of the handle 35 along the scale will cause equal variations in the speed of the governed apparatus. It will be apparent from this that the cam is employed merely because its operating faces can be easily constructed to produce the required motion of the valve 20. In apparatus, in which the scale is graduated to indicate the variations of pressure, within the chamber 5, any suitable connection may be employed between the handle 35 and the valve 20.

Besides the cylinder 38 and the piston 40, the speed responsive device 39 may briefly be described as follows: Within the bearing 41 is a spring 42, one end of which bears against one end of the bearing and the other end of which bears against a shoulder on the piston or spindle 40. Surrounding the bearing 41 is a sleeve 43 carrying a gear 44 which meshes with a gear 45 on the governor shaft 46. The end of the sleeve 43 distant from the gear 44 is provided with a collar 47 to which the links 48 of the governor weights 49 are connected. On the spindle 40 is a collar 50 to which the links 51 of the governor weights 49 are secured. Fast to the spindle 40 is a collar 52, which, when the piston spindle is raised, will raise the collar 50 and bring the weights 49 toward their axis of rotation and when the piston drops, the weights will move out. The piston spindle 40 is connected to a lever 53 which may have connection with suitable devices to be operated, as for example, the oil relay of a valve mechanism.

Referring now to Fig. 1 and assuming that all of the parts are properly assembled, the operation of the device is as follows: Inasmuch as the chest 15 is in open communication with the reservoir 17, pressure may be introduced into the chamber 5 by moving the valve 20. By moving the lever 35 from right to left the slide valve will be moved from left to right. The piston valve 29 will remain immovable so that air may pass from the air chest through the port 25 through the ports 26 and 19 into the cylinder 5 through the inlet port 6. The distance the lever 35 is moved along the segment 37 will determine the size of the port area uncovered and will determine the amount of pressure admitted into the chamber 5. When the desired amount of pressure is admitted into the chamber 5, pressure will be exerted against the piston 9 so that the piston valve 29 will be moved from left to right to close the port 25 and shut off communication between the air chest and the chamber 5. Should the pressure drop in the chamber 5, the piston will move from right to left and uncover the port 25 long enough to admit air through the ports 25, 26, 19 and 6 to cause a pressure to rise in the chamber 5 to move the piston 9 against the spring and thus close the port 25. If the pressure in the chamber 5 is excessive, the piston valve 29 will not only be moved to close the port 25, but it will be moved far enough to uncover the port 27 and permit some of the pressure to exhaust through the port 27 into the port 28 and into the chamber formed by the recesses 31 and 32, whence the air may exhaust to atmosphere, as for example, through the slot 54. If there happens to be an excess pressure in the chamber 5 and the piston 9 is moved far enough in one direction to cause the piston valve 29 to uncover the port 27, as soon as the pressure has dropped enough the piston 9 will move back from right to left so as to close the port 27 and both ports 25 and 27 may be closed so long as the determined pressure in the chamber 5 is maintained. In actual practice, however, it may be found that the piston 9 is very sensitive and that there will be almost constantly a vibration of the valve 29 to first open and then shut off communication between the chest and the chamber 5. It will be apparent that by operating the controller lever, any pressure between two extremes may be maintained in the chamber 5 and that any selected pressure will be automatically maintained by the valve mechanism heretofore described, and that the speed of the governed apparatus will be maintained approximately at the speed indicated by the position of the lever 35 relative to the graduated segment 37.

It is to be understood that although I have shown the controller as being adapted for use in connection with a speed responsive device, it does not follow that this is necessarily a controller to be operated in connection with such a mechanism; it being obvious that broadly, the invention consists of mechanism for determining the amount of pressure passing from one source to another and means for maintaining the determined pressure constant.

Having thus described my invention, what I claim is:

1. In a device of the character described, a chamber having a fluid delivery port communicating therewith, a hollow movable member covering the port and provided with a fluid inlet and a fluid exhaust passage, means for establishing or cutting off communication between said delivery port and the inlet or exhaust passage, and means movable in response to variations in pressure within said chamber for actuating said last mentioned means.

2. In a pressure controller, a pressure chamber, having an inlet port and a pressure delivery port, a chamber communicating with a source of substantially constant pressure, an exhaust port, port controlling means for placing said inlet port in communication with said last mentioned chamber or with said exhaust port, and means responsive to the pressure within said pressure chamber for controlling the operation of said port controlling means.

3. A controller comprising a casing having a pressure delivery port, a valve for controlling the admission of fluid to and the discharge of fluid from said casing, a piston responsive to pressure variations within the casing for actuating said valve, and manually operable means for controlling the effective operation of the valve.

4. In a pressure controller, an air chamber having an inlet port and a delivery port, a passage communicating with a source of substantially constant pressure, an exhaust port, port controlling means for placing said inlet port in communication with said passage or said exhaust port, and means employing a spring for yieldingly decreasing the volumetric capacity of said chamber and for controlling the operation of said port controlling means.

5. In a pressure controller, a chamber or cylinder, a port leading into the chamber adapted to admit pressure and exhaust it, a sliding member inclosing said port and having an inlet port communicating with the source of supply and an outlet port communicating with the atmosphere, and a spring-pressed plunger carrying means for alternately opening the inlet port and closing the exhaust port and opening the exhaust port and closing the inlet port in the sliding member.

6. In a pressure controller, a pressure chamber having an inlet and a delivery port, a manually controlled member having a fluid delivery port and an exhaust port, capable of being placed in communication with the inlet port of the pressure chamber, and a valve, responsive in operation to the pressure within the pressure chamber for controlling communication between said inlet port and the delivery and exhaust ports of said member.

7. A pressure controller comprising a pressure chamber having an inlet port and a fluid delivery port, a source of constant pressure communicating with the inlet port, an exhaust port, a valve for controlling communication between said inlet port and said source of constant pressure and said exhaust port, and a pressure responsive piston located within the chamber for actuating the valve.

8. In a pressure controller, a pressure chamber having an inlet port and a delivery port, a passage communicating with a source of substantially constant pressure and with said inlet port, an exhaust port, and valve members for controlling communication between said inlet port, said passage and said exhaust port, one of said valve members being movable with relation to the other.

9. In a pressure controller, a pressure chamber having an inlet and a delivery port, a pressure chest communicating with the inlet port and with an exhaust port, a manually operable slide member, and a pressure actuated valve for controlling communication between the inlet port, said pressure chest and said exhaust port.

10. In a pressure controller, a chamber having an inlet and an outlet port, a movable hollow member provided with an opening communicating with the inlet port, an automatic valve for controlling the delivery of fluid through the opening in said element, means responsive to pressure within said chamber for controlling the operation of said automatic valve and means for moving said element relatively to said automatic valve and for thereby varying the pressure within said chamber.

11. In a pressure controller, a chamber having an inlet and an outlet port, a movable member provided with an opening communicating with said inlet port, an automatic valve for controlling the delivery of fluid through the opening in the member, a pressure actuated piston responsive to pressure within said chamber for actuating said automatic valve and means for moving said member independently of said automatic valve and thereby varying the pressure within said chamber.

12. In a pressure controller, a chamber having an inlet and an outlet port, movable means provided with an opening communicating with said inlet port and with an exhaust port, a valve responsive to the pressure within said chamber and means for moving said movable means independently of said valve, and thereby varying the pressure within said chamber.

13. In a pressure controller, a chamber having a common inlet and outlet port, a valve seat having two ports, each adapted at times to communicate with said common port, a valve member for alternately opening one port and closing the other, the movement of the valve member being dependent upon the pressure within said chamber and a spring motor acting on said member in opposition to the pressure within said chamber.

14. In a pressure controller, a pressure chamber provided with a port, a displacer piston within said chamber, a spring for opposing the motion of said piston in response to the pressure within said chamber, a manually movable member having an inlet port, communicating with a source of fluid under substantially constant pressure, an exhaust port, and a port communicating with the port of said pressure chamber, and a valve controlled by said piston for controlling communication between the port of said pressure chamber, and the inlet and exhaust port of said member.

15. In a pressure controller, an air chamber provided with a port and in operative connection with a device adapted to be acted upon by different pressures, a displacer piston within said chamber, a motor the effectiveness of which is independent of the leakage from said chamber past said piston for yieldingly resisting the movement of said piston by the pressure within said chamber, a source of air under pressure, a valve device interposed between said source and said port and operatively connected to said piston for controlling the passage of air through said port either from said source of supply to said chamber or from said chamber to the atmosphere and manually operated means acting in conjunction with said valve device for determining the air pressure within said chamber.

16. A controller comprising a casing inclosing a pressure chamber provided with a pressure delivery port and a fluid inlet port, a single valve for controlling the admission to and the delivery of fluid from said fluid inlet port, and manually adjustable means for controlling the effective operation of the valve.

17. A controller for delivering variable fluid pressures, comprising a chamber having a pressure inlet port and a fluid delivery port, a chamber communicating with a source of substantially constant pressure and with said inlet port, a discharge port, a single valve for controlling communication between said chambers and for controlling the delivering of fluid to said discharge port, and a piston responsive to variations of pressure within said first mentioned chamber for actuating said valve.

18. A controller for delivering variable pressure, comprising a chamber having a pressure delivery port and a fluid inlet port, a second chamber communicating with said inlet port to contain fluid at substantially constant pressure, a discharge port, a valve mechanism for controlling communication between said chambers through said inlet port and communication between the first mentioned chamber and the discharge port, a piston responsive to variations of pressure within said first mentioned chamber for actuating the valve mechanism and manually controlled means varying the operation of said valve mechanism.

19. A controller comprising a casing inclosing a pressure chamber having a pressure delivery port and a fluid inlet port, a source of substantially constant fluid pressure, a valve for controlling communication between said source of pressure and the fluid inlet port and between said port and a fluid discharge port with which the casing is provided, means responsive to variations of pressure in the chamber for actuating said valve, and a manually movable seat for said valve for controlling the operation of said valve.

20. A controller comprising a casing inclosing a pressure chamber provided with a pressure delivery port and a fluid inlet port, a source of substantially constant fluid pressure, a manually adjustable ported slide located between the source of pressure and said fluid inlet port, and an exhaust port with which the casing is provided, a valve, responsive to variations of pressure in said chamber, mounted on said slide and controlling communication between said source of pressure, said fluid inlet, and said exhaust port.

21. A controller comprising a casing inclosing a pressure chamber provided with a pressure delivery port and a fluid inlet port, a source of substantially constant pressure, a reducing valve between said source and said fluid inlet port for delivering pressure to and discharging pressure from said chamber, and manually adjustable means for varying the operation of the valve.

In testimony whereof, I have hereunto subscribed my name this 10th day of August, 1910.

HERBERT T. HERR.

Witnesses:
E. W. McCALLISTER,
JOHN A. ELDEN.